(12) United States Patent
Hall

(10) Patent No.: US 12,351,072 B2
(45) Date of Patent: Jul. 8, 2025

(54) COOLING SYSTEM, VEHICLE COMPRISING SUCH COOLING SYSTEM AND A METHOD OF COOLING A BATTERY

(71) Applicant: Scania CV AB, Södertälje (SE)

(72) Inventor: Ola Hall, Stockholm (SE)

(73) Assignee: Scania CV AB, Södertälje (SE)

( * ) Notice: Subject to any disclaimer, the term of this patent is extended or adjusted under 35 U.S.C. 154(b) by 484 days.

(21) Appl. No.: 17/279,988

(22) PCT Filed: Sep. 27, 2019

(86) PCT No.: PCT/SE2019/050928
§ 371 (c)(1),
(2) Date: Mar. 25, 2021

(87) PCT Pub. No.: WO2020/080991
PCT Pub. Date: Apr. 23, 2020

(65) Prior Publication Data
US 2021/0394643 A1    Dec. 23, 2021

(30) Foreign Application Priority Data

Oct. 16, 2018    (SE) .................................... 1851261-6

(51) Int. Cl.
*B60L 58/26*      (2019.01)
*B60H 1/00*       (2006.01)
(Continued)

(52) U.S. Cl.
CPC .......... *B60L 58/26* (2019.02); *B60H 1/00278* (2013.01); *B60H 1/143* (2013.01);
(Continued)

(58) Field of Classification Search
CPC ..... B60L 58/26; B60L 58/27; B60H 1/00278; B60H 1/143; H01M 10/486;
(Continued)

(56) References Cited

U.S. PATENT DOCUMENTS 6,425,257 B1 *    7/2002    Ohseki ................... F25B 27/02
                                                            62/244
9,680,190 B1 *    6/2017    Xia .................... H01M 10/6557
(Continued)

FOREIGN PATENT DOCUMENTS

CN    102548780 A    7/2012
CN    107020921 A    8/2017
(Continued)

OTHER PUBLICATIONS

DE102011016070A1 Machine Translation (Year: 2011).*
(Continued)

*Primary Examiner* — Len Tran
*Assistant Examiner* — Gustavo A Hincapie Serna
(74) *Attorney, Agent, or Firm* — Moore & Van Allen PLLC; W. Kevin Ransom

(57) ABSTRACT

A cooling system is disclosed for controlling the temperature of a battery within a temperature interval, the system comprising a chiller and a chiller line arranged in heat exchange with said chiller, a heat source and a high temperature line arranged in heat exchange with said heat source, a battery line arranged in heat exchange with the battery, a pump arranged to convey a cooling fluid in at least one of said lines, a condenser and a refrigeration circuit arranged in heat exchange with said condenser, wherein a working medium is arranged to, in operation, circulate in said refrigeration circuit, wherein a valve is arranged to selectively connect the chiller line into heat exchange with the battery line so as to provide cooling of the battery, and a valve is arranged to selectively connect the high temperature line for heat exchange with the battery line to heat the battery.

13 Claims, 9 Drawing Sheets

(51) Int. Cl.
*B60H 1/14* (2006.01)
*B60L 58/27* (2019.01)
*H01M 10/48* (2006.01)
*H01M 10/625* (2014.01)
*H01M 10/633* (2014.01)
*H01M 10/6556* (2014.01)
*H01M 10/6568* (2014.01)
*H01M 10/66* (2014.01)

(52) U.S. Cl.
CPC ............ *B60L 58/27* (2019.02); *H01M 10/486* (2013.01); *H01M 10/625* (2015.04); *H01M 10/633* (2015.04); *H01M 10/6556* (2015.04); *H01M 10/6568* (2015.04); *H01M 10/66* (2015.04); *H01M 2220/20* (2013.01)

(58) Field of Classification Search
CPC ............. H01M 10/625; H01M 10/633; H01M 10/6556; H01M 10/6568; H01M 10/66; H01M 2220/20; H01M 10/613; F01P 3/20; F01P 9/06; F01P 2050/24
USPC ......................................... 165/202
See application file for complete search history.

(56) References Cited

U.S. PATENT DOCUMENTS

| | | | |
|---|---|---|---|
| 9,701,215 B1 | 7/2017 | Kim | |
| 10,336,193 B2* | 7/2019 | Ben Ahmed | B60H 1/00899 |
| 10,688,847 B2* | 6/2020 | Kim | B60H 1/00278 |
| 10,875,385 B2* | 12/2020 | Durrani | B60H 1/32284 |
| 11,021,037 B2* | 6/2021 | Hwang | B60H 1/323 |
| 11,065,934 B2* | 7/2021 | Lee | H01M 10/6568 |
| 11,958,334 B2* | 4/2024 | Chatham | B60H 1/00921 |
| 2009/0249807 A1 | 10/2009 | Nemesh et al. | |
| 2012/0085512 A1 | 4/2012 | Graaf et al. | |
| 2012/0174602 A1 | 7/2012 | Olivier et al. | |
| 2012/0183815 A1* | 7/2012 | Johnston | B60L 58/26 429/50 |
| 2013/0175022 A1 | 7/2013 | King et al. | |
| 2013/0298583 A1 | 11/2013 | O'Donnell et al. | |
| 2014/0038009 A1* | 2/2014 | Okawa | H01M 10/6555 429/62 |
| 2014/0338376 A1 | 11/2014 | Carpenter et al. | |
| 2015/0202986 A1* | 7/2015 | Hatakeyama | F25B 5/02 165/287 |
| 2016/0107501 A1* | 4/2016 | Johnston | B60H 1/00278 165/41 |
| 2016/0318370 A1* | 11/2016 | Rawlinson | B60H 1/32281 |
| 2016/0318499 A1* | 11/2016 | Yamanaka | B60L 58/27 |
| 2017/0008407 A1 | 1/2017 | Porras et al. | |
| 2017/0217279 A1 | 8/2017 | Jalilevand et al. | |
| 2017/0253105 A1* | 9/2017 | Allgaeuer | B60H 1/143 |
| 2017/0297407 A1 | 10/2017 | Shan et al. | |
| 2018/0037086 A1* | 2/2018 | Nicgorski | B60H 1/00885 |
| 2019/0366876 A1* | 12/2019 | Cheadle | B60L 58/27 |
| 2019/0381857 A1* | 12/2019 | Lee | H01M 10/613 |
| 2020/0184917 A1* | 6/2020 | Morita | G09G 3/3614 |
| 2020/0189417 A1* | 6/2020 | Amarasinghe | B60L 58/24 |
| 2020/0259229 A1* | 8/2020 | Wu | H01M 10/625 |
| 2020/0361275 A1* | 11/2020 | Hwang | B60H 1/3213 |
| 2021/0001683 A1* | 1/2021 | Mothier | B60H 1/00885 |
| 2021/0031588 A1* | 2/2021 | Yahia | F25B 49/02 |
| 2021/0309070 A1* | 10/2021 | Ishizeki | B60H 1/32011 |
| 2021/0384572 A1* | 12/2021 | Lee | B60H 1/32284 |
| 2022/0349627 A1* | 11/2022 | Lee | F25B 5/04 |

FOREIGN PATENT DOCUMENTS

| | | | | |
|---|---|---|---|---|
| DE | 102009023235 A1 | 12/2010 | | |
| DE | 102011016070 A1 * | 10/2012 | ......... | B60H 1/00278 |
| FR | 2992260 A1 | 12/2013 | | |
| JP | 2015140093 A | 8/2015 | | |
| KR | 20180051419 A | 5/2018 | | |
| WO | 2014000884 A1 | 1/2014 | | |
| WO | 2015094097 A1 | 6/2015 | | |
| WO | 2015115050 A1 | 8/2015 | | |
| WO | 2018045013 A1 | 3/2018 | | |
| WO | WO-2018064054 A1 * | 4/2018 | ......... | B60H 1/00278 |

OTHER PUBLICATIONS

Scania CV AB, International Application No. PCT/SE2019/050928, International Search Report, Dec. 11, 2019.
Scania CV AB, International Application No. PCT/SE2019/050928, Written Opinion, Dec. 11, 2019.
Scania CV AB, Swedish Application No. 1851261-6, Office Action, May 6, 2019.
Scania CV AB, Swedish Application No. 1851261-6, Office Action, Dec. 13, 2019.
Scania CV AB, European Patent Application No. 19873173.9, Extended European Search Report, Jun. 3, 2022.
Scania CV AB, International Patent Application No. PCT/SE2019/050928, International Preliminary Report on Patentability, Apr. 14, 2021.
Scania CV AB, Brazilian Patent Application No. BR 112021005565-7, Preliminary Office Action, Aug. 29, 2023.
Scania CV AB, Chinese Patent Application No. 201980067102.6, First Office Action, Jan. 29, 2024.

* cited by examiner

COOLING SYSTEM, VEHICLE COMPRISING SUCH COOLING SYSTEM AND A METHOD OF COOLING A BATTERY

CROSS-REFERENCE TO RELATED APPLICATIONS

This application is a National Stage Application (filed under 35 § U.S.C. 371) of PCT/SE2019/050928, filed Sep. 27, 2019 of the same title, which, in turn claims priority to Swedish Application No. 1851261-6 filed Oct. 16, 2018 of the same title; the contents of each of which are hereby incorporated by reference.

FIELD OF THE INVENTION

The invention relates to a cooling system for a vehicle and a vehicle comprising such a cooling system. The invention also relates to a method of cooling a battery in a vehicle.

BACKGROUND OF THE INVENTION

In the automotive industry it has become more and more important to a have an efficient utilization of resources, including waste heat. Typically, a vehicle contains different heat sources which are in need of cooling and of which the waste heat may be utilized to heat the cab of the vehicle and/or other features of the vehicle.

In a vehicle driven by an electric motor both the motor and the batteries for powering the motor may be in need of cooling to different degrees. The batteries should normally be held in a temperature interval between 15 and 30° C., which means that although they produce waste heat and will need cooling most of time, there are also occasions where the batteries will need to be heated.

This calls for a system capable of both delivering and removing heat depending on current operation conditions and depending on the ambient temperature. Often, this may lead to cooling systems comprising separate heating and cooling systems, which may be space demanding and which may still not be fully adapted to handle different operation conditions and temperatures in a satisfactory manner.

It would be advantageous to achieve a cooling system overcoming, or at least alleviating, at least one or some of the drawbacks of the prior art. In particular it would be advantageous with a cooling system, which is adapted to handle different operation conditions and ambient temperatures in a satisfactory manner.

SUMMARY OF THE INVENTION

It is an object of the invention to provide a cooling system, which is adapted to handle different operation conditions and different ambient temperatures, and in which cooling system resources may be utilized in an efficient manner.

According to a first aspect the invention relates to a cooling system for tempering a battery inside a specific temperature interval, the cooling system comprising:
  a chiller and a chiller line arranged in heat exchange with said chiller,
  a heat source and a high temperature line arranged in heat exchange with said heat source,
  a battery line arranged in heat exchange with the battery,
  at least one pump, arranged to in operation convey a cooling fluid in at least one of said lines, and
  a condenser and a refrigeration circuit arranged in heat exchange with said condenser, wherein a working medium is arranged to in operation be circulated in said refrigeration circuit, wherein the chiller line is selectively connectable into at least partial heat exchange with the battery line so as to provide cooling of the battery, and wherein the high temperature line is selectively connectable into at least partial heat exchange with the battery line to heat the battery.

With the inventive cooling system, it is possible to provide a desired temperature to a battery regardless of the ambient temperature and regardless of a current operation mode.

The inventive cooling system inter alia provides for the possibility to have one temperature in the chiller line, and another preferably higher temperature in the battery line cooling the battery. This allows the chiller to operate at an optimal temperature and at the same time provide a cooling fluid to the battery line of an optimal temperature for cooling the battery.

In embodiments of the invention the working medium of the refrigeration circuit is arranged to be cooled by heat exchange with the cooling fluid in the high temperature line in said condenser.

In embodiments of the invention the refrigeration circuit is arranged via the chiller, said chiller being arranged to heat the working medium of the refrigeration circuit by heat exchange with the cooling fluid in the chiller line, which cooling fluid is thereby cooled. Thereby, the chiller and condenser will contribute to the tempering of the battery both in typical summer conditions, where the battery may be cooled be the chiller, and in typical winter conditions, where the battery may be heated be the condenser.

In embodiments of the invention the cooling system comprises at least one radiator, which is connectable to the chiller, to selectively heat said chiller.

In embodiments of the invention the cooling system comprises a radiator, which is connectable to the high temperature line, so as to selectively cool the cooling fluid in said high temperature line, said radiator being either the same radiator as the at least one radiator that is connectable to the chiller, or a separate radiator.

In embodiments of the invention at least one valve is arranged to selectively connect the chiller line into heat exchange with the battery line so as to provide cooling of the battery, and wherein at least one valve is arranged to selectively connect the high temperature line for heat exchange with the battery line to heat the battery. The valves may be regulated between a very low flow to a full flow allowing a desired heat exchange to take place in order to correctly temper the battery.

In embodiments of the invention the heat source is an electric engine, a combustion engine and/or an electric heater.

In embodiments of the invention the cooling system comprises a mixing line, wherein the chiller line and/or the high temperature line are connectable for heat exchange with the battery line via said mixing line. The mixing line may be used as an instrument to provide a correct temperature to the battery. The mixing line provides a possibility to have different temperatures, which may be optimized for each line, in the high temperature line, the chiller line, and the battery line, respectively. This may be achieved in that each line has an individually controlled partial heat exchange with the mixing line. In reality, the system may include more than one mixing line, which may or may not be interconnected to each other.

In embodiments of the invention the cooling system further comprises an AC circuit for providing an air flow of a desired temperature to a cab, the condenser being arranged to cool a working medium that is circulated in said AC circuit and wherein said AC circuit comprises an evaporator for absorbing heat to said working medium from the air flow to be provided to the cab as said working medium is evaporated in said evaporator. With this embodiment the condenser will have a double function, i.e. both for tempering the battery in all conditions of ambient temperature, but also to climatize a cab in all conditions of ambient temperature.

In embodiments of the invention the chiller line, battery line, and the high temperature line are interconnectable such that the same cooling fluid may be circulated in all of said lines. This is a compact and effective manner of achieving a heat exchange between the relevant parts of the cooling system.

In embodiments of the invention a main mixing valve is arranged to selectively connect the chiller line to the battery line, and/or wherein a battery outlet valve is arranged to selectively connect the battery line to the high temperature line.

In embodiments of the invention the battery line comprises a plurality of sublines, for cooling separate batteries or separate portions of the battery, each subline being provided with a separate pump.

In embodiments of the invention sensors are arranged to monitor the temperature in the different lines, and wherein a control unit is arranged to control the heat exchange between the chiller line and the battery line and/or between the high temperature line and the battery line based on said monitored temperatures. The control unit makes it possible to automatize the regulation of the cooling system.

According to a second aspect the invention relates to a vehicle that comprises a cooling system as disclosed above.

According to a third aspect the invention relates to a method of tempering a battery in a vehicle, the method comprising the following steps:
monitoring a current temperature of said battery,
based on said monitored temperature, deciding if said battery needs to be cooled or heated, wherein cooling is decided to be needed if the current temperature is above a high threshold temperature, and wherein heating is decided to be needed if the current temperature is below a low threshold temperature,
if the current temperature is above said high threshold temperature, providing a cooling fluid of a temperature that is lower than said high threshold temperature to cool said battery with cooling fluid cooled in a chiller, said chiller thereby heating a working medium that is circulated to a condenser where it is cooled,
if the current temperature is below said low threshold temperature, providing a cooling fluid of a temperature that is higher than said low threshold temperature to heat said battery from a heat source and/or said condenser.

The method may further comprise steps for air climatization of a cab in a vehicle, the method thus comprising the following steps:
monitoring a current temperature of said cab,
based on said monitored temperature, deciding if said cab needs to be cooled or heated, wherein cooling is decided to be needed if the current temperature is above a high threshold temperature, and wherein heating is decided to be needed if the current temperature is below a low threshold temperature,
if the current temperature is above said high threshold temperature, providing heat exchange in an evaporator for the air flow entering the cab with the working fluid arriving from said chiller,
if the current temperature is below said low threshold temperature, providing heat exchange for the air flow entering the cab with the cooling fluid heated by said heat source and/or said condenser.

Other embodiments and advantages will be apparent from the detailed description and the appended drawings.

BRIEF DESCRIPTION OF THE DRAWINGS

Below, specific embodiments of the invention will be described with reference to the appended drawings, of which.

DETAILED DESCRIPTION OF THE SHOWN EMBODIMENTS

Below, a cooling system 1 in accordance with the invention will be described as a cooling system of a vehicle 23. The cooling system may however also be used in other applications. The vehicle 23 is very schematically illustrated by a box 23 with interrupted lines incorporating the cooling system 1. The cooling system and methods shown in the FIGS. 2-8 are also adapted for use on a vehicle, although no vehicle is illustrated in these drawings.

The cooling system 1 described below includes a number of valves, pumps and interconnected lines. In order to distinguish them from each other some of these features are given names related to nothing else than their specific location in the system, typically based on the vicinity to another feature.

Figure 1:
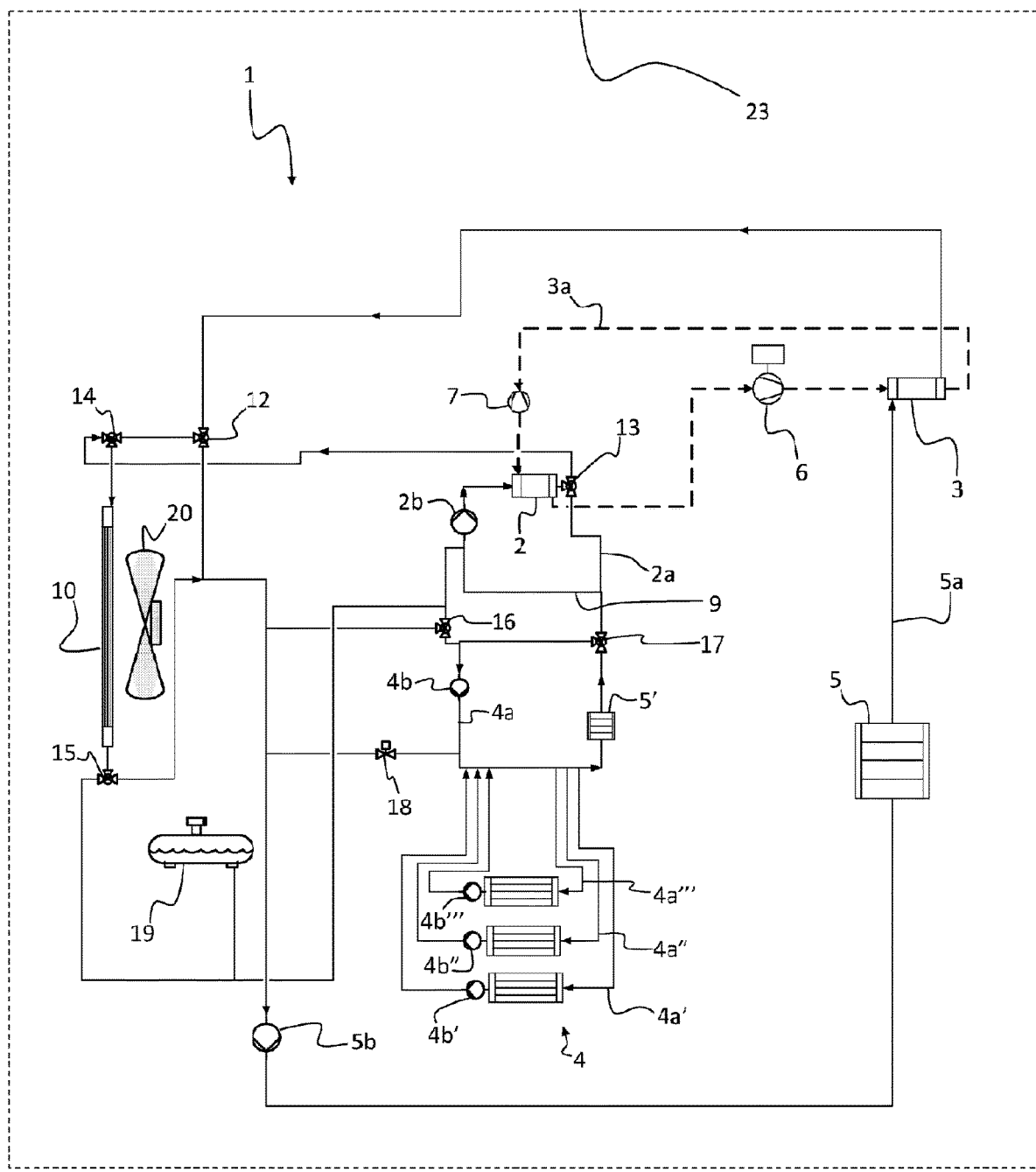
FIG. 1 is a schematic representation of a cooling system according to a first embodiment.

In FIG. 1 a first embodiment of a cooling system 1 is presented. The cooling system comprises a chiller 2, which is arranged on a line, here denoted the chiller line 2a, wherein a pump, here denoted the chiller pump 2b, is arranged to circulate a cooling fluid in said chiller line 2a via said chiller 2. The chiller line 2a is connectable for heat exchange with a battery line 4a passing a battery 4 comprised of one or more parts or battery packs. Throughout this specification, the terms connectable for/into "heat exchange" is used to cover both heat exchange by mixing of cooling fluid and the heat exchange of cooling fluid over a heat exchanger.

A battery pump 4b may be provided to circulate the cooling fluid along the battery line 4a. In the shown embodiment the battery 4 includes three individual battery packs that are tempered in parallel via separate sub-lines 4a', 4a" and 4a''', each line being provided with an individual pump 4b', 4b" and 4b'''. The outlet of these sub-lines 4a', 4a" and 4a''' arrive up-stream on the battery line 4a with respect to inlet of the same sub-lines 4a', 4a" and 4a'''. Hence, a portion of the cooling fluid passing by the battery packs is recirculated after having been mixed with a portion arriving from the battery line 4a.

The battery line 4a may be fed from different sources depending on a current temperature need of the battery. In summer conditions, the battery typically need to be cooled to be maintained in a typical desired temperature interval of 15-30° C. Therefore, in such conditions, the cooling fluid from the chiller line 2a is arranged to cool the battery 4. In the shown embodiment the chiller line 2a is connected to the battery line 4a via a mixing line 9, to which other lines may also be connected. The mixing line 9 allows for the possibility to control the temperature of the cooling fluid arriving to the battery line from inter alia the chiller line 2a. A main mixing valve 17 is arranged to allow a portion of the flow in the battery line 4a to pass into the mixing line 9. In the shown embodiment the mixing line 9 may be seen as a part of the chiller line 2a.

The mixing line 9 is, in the shown embodiment, also connectable for heat exchange with a high temperature line 5a that passes by a heat source 5. The heat source 5 may be an electrical heater or it may be a power means in need of cooling, such as the power electronics of the vehicle, an electric motor for driving the vehicle, or it may be a combustion motor if one is provided on the vehicle. In the shown embodiment a heat return valve 16 is arranged to allow a return flow into the battery line 4a. The heat return valve 16 may hence be opened from the high temperature line 5a when the battery 4 needs to be heated. Typically, cool cooling medium is allowed to exit from the battery line 4a to the high temperature line 5a via the battery outlet valve 18, whereby the battery line 4a is filled with relatively warmer cooling medium via the heat return valve 16.

In summer conditions no heating of the battery 4 is needed and the valves are controlled to allow the cooling fluid of the high temperature line 5a to bypass the battery line 4a. In other words, the battery outlet valve 18 will be closed. Instead, a portion of the flow passing in the mixing line 9 (from right to left in FIG. 1) will be redirected to the battery line 4a via the heat return valve 16 and the battery pump 4b. The main mixing valve 17 may hence be arranged to divide the flow between the battery line 4a and the mixing line 9. The more cooling the battery 4 needs, the greater portion of the flow will be directed to the mixing line 9. The high temperature line 5a is, in this mode, arranged to cool the heat source 5 and to cool a condenser 3.

The condenser 3 is arranged on a refrigeration circuit 3a, which also includes a compressor 6 and an expansion valve 7. The refrigeration circuit 3a comprises a working medium which is separate from the cooling fluid of the rest of the cooling system. The refrigeration circuit 3a is arranged via the chiller 2, which cools the cooling fluid of the cooling system and thereby, at the same time, the chiller 2 heats the working medium in the refrigeration circuit 3a. The working medium in the refrigeration circuit 3a is subsequently cooled and condensed in the condenser 3, wherein the heat emitted from the condenser 3 will heat the cooling fluid in the high temperature line 5a.

Further, the cooling system 1 includes a radiator 10 arranged to inter alia cool the cooling fluid passing through the high temperature line 5a. This is useful in summer conditions where excess heat is produced and needs to be relieved to the surroundings. This is hence done by opening the radiator bypass valve 12 and the radiator inlet valve 14 towards the radiator 10 to thereby let the radiator 10 emit heat from the cooling fluid to the ambient air.

An advantage of the inventive cooling system is that parts of the cooling system may be utilized in different manners and for different purposes under different conditions.

In typical winter conditions, the batteries of the battery 4 will need to be heated to be maintained in the desired temperature interval. In such conditions the radiator valve 12 will be controlled to allow the cooling fluid in the high temperature line 5a to bypass the radiator 10. The idea in this mode is that heat from the condenser 3 and from the heat source 5, e.g. power electronics of a vehicle, will be utilized to keep the batteries at a desired temperature. This is achieved in that a controlled manner in that a chiller valve 13 arranged at the outlet of the chiller 2 opens towards the inlet end of the radiator 10. A radiator inlet valve 14 is arranged to direct the flow from the chiller 2 to the radiator 10. The outlet from the radiator 10 is controlled by a radiator outlet valve 15, via the chiller pump 2b to the chiller 2. In this mode the radiator 10 will be utilized for heating purposes to heat the cooling fluid passing through the chiller line 2a. The chiller 2 will thereby heat the working medium of the refrigeration circuit 3a passing by the expansion pump 6 to the condenser 3 at which the working medium will be condensed whereby heat will be emitted from the working medium of the refrigeration circuit 3a to the cooling fluid of the high temperature line 5a.

The battery 4 is heated by the cooling fluid in the high temperature line 5a. This is achieved in that a heat return valve 16 allows a flow of cooling fluid from the high temperature line 5a into the battery line 4a to thereby increase the temperature of the cooling fluid in the battery line 4a. A battery outlet valve 18 is arranged to allow a heat exchange with the high temperature line 5a, e.g. a return flow back into the high temperature line 5a. As an alternative, a heat exchanger may be arranged to provide said heat exchange.

Thereby, a balancing of the temperatures in the battery line 4a and the high temperature line 5a is achieved. The temperature of the battery line 4a is increased such that the battery 4 may be kept at a desired temperature and the temperature of the high temperature line 5a is decreased such that a relevant cooling of the heat source 5 and condenser 3 may be achieved.

Sensors are preferably arranged to monitor the temperature in the different lines. The valves are controlled in response to the monitored temperatures so as to provide the desired temperatures in the different lines, typically the high temperature line 5a and the battery line 4a. If the temperature balancing is not satisfactory, other regulating means are available. If further cooling of the high temperature line 5a is needed, a balanced amount of the cooling fluid may be passed through the high temperature radiator 10' by proper regulation of the valves. Further, an auxiliary heater 5' may be provided to heat the cooling fluid in connection to the battery line 4a if further heating of the battery 4 is desired. In the shown embodiment an auxiliary heater 5' is provided on the battery line 4a.

An expansion tank 19 is arranged along the high temperature line 5a to compensate for temperature differences and related pressure differences in the cooling system 1. Deaeration lines (not shown) are used in all the shown embodiments for ensuring that the air within the system is directed to the expansion tank 19. Shut off valves on the deaeration lines may be used to prevent pumping losses, heat losses or mixing of cooling fluid of different temperatures.

Figure 2:
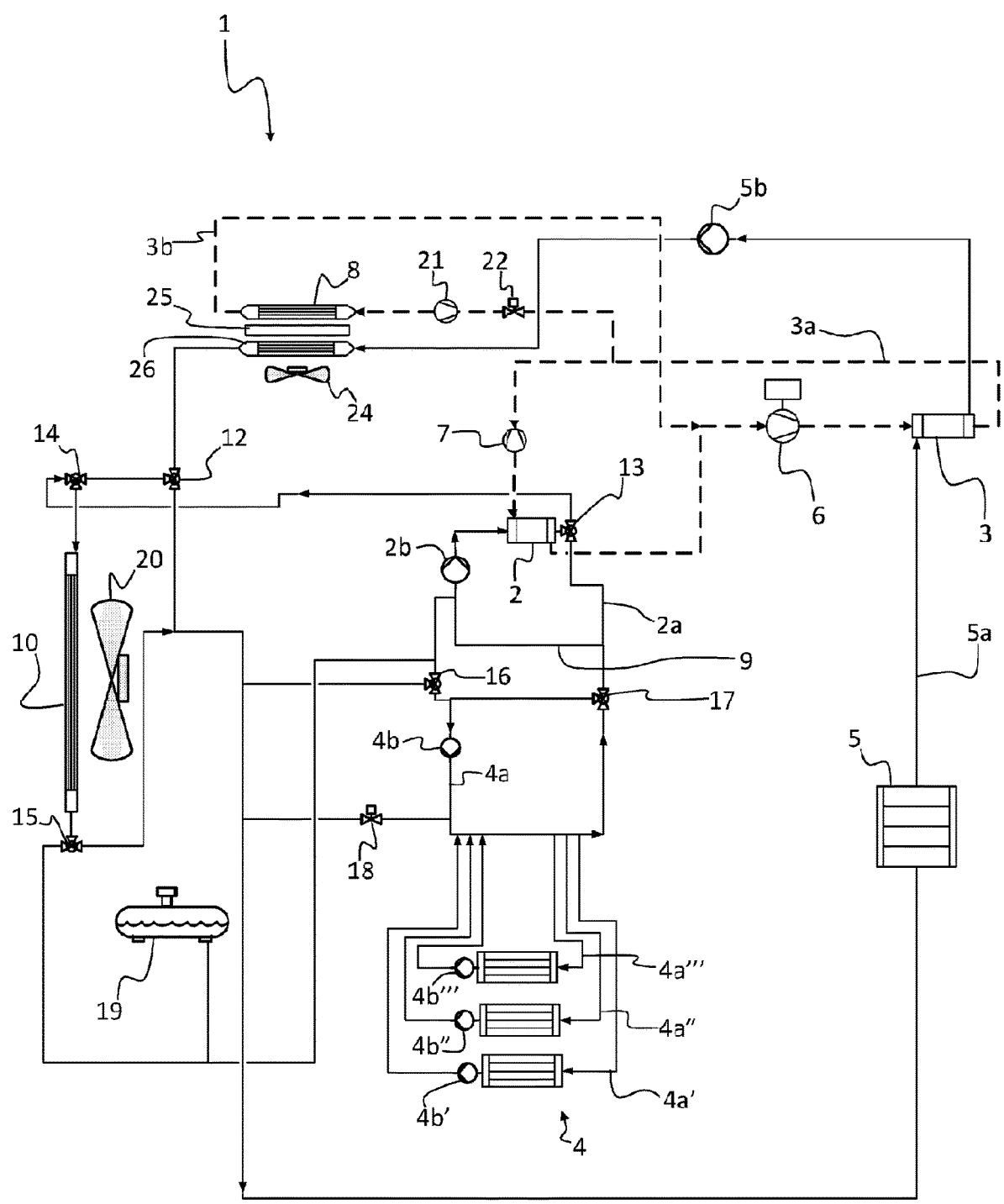
FIG. 2 is a schematic representation of a cooling system according to a second embodiment.

In FIG. 2 a second embodiment of the inventive cooling system is disclosed. In the shown second embodiment an AC circuit 3b is arranged to provide a comfortable temperature in a cab (not shown) of a vehicle in which the cooling system 1 is arranged. The AC circuit of the shown embodiment shares working medium with the refrigeration circuit 3a, which is cooled by the condenser 3. The AC circuit 3b includes an evaporator 8, an expansion valve 21 and a shut off valve 22. The evaporator 8 is arranged to evaporate the working medium in the AC circuit 3b and to provide cooling to the cab of the vehicle. A HVAC-fan 24 is arranged to provide a forced air flow past the evaporator 8, where HVAC stands for Heating Ventilation Air Condition. In a conventional manner the working medium is evaporated in the evaporator 8, whereby heat is taken from the passing air flow which is thereby cooled as it enters the cab.

In this second embodiment that includes an AC circuit 3b for climatization of the cab, the condenser 3 has a double function in that it condenses working medium both for the chiller 2 and the evaporator 8. Thereby, the condenser 3 may be in greater need of cooling, and the heat delivered to the high temperature line 5a will, in such a case, be more important.

In the figures, the complete flow in the high temperature line 5a is passed through the cab heater 26. In a not shown embodiment only a portion of the flow of the high temperature line 5a is passed through the cab heater 26, wherein the other portion is arranged to bypass said cab heater. This may be advantageous to avoid a fall of pressure in said high temperature line 5a.

In summer conditions, with a typical ambient temperature of about 25° C. or higher the battery 4 needs to be cooled to be maintained in the typical desired temperature interval of 15-30° C. In such conditions the cooling fluid passes from the chiller valve 13 towards the mixing line 9 via the chiller line 2a, and from the battery line 4a to the mixing line 9 via the main mixing valve 17. The cooling fluid re-enters the battery line 4a from the mixing line 9, via the heat return valve 16, and flows via the battery pump 4b into the separate battery lines 4a', 4a", 4a'''.

The cooling fluid on the chiller line 2a passing the chiller 2 is cooled by the evaporated working medium arriving in the refrigeration circuit 3a from the condenser 3. The condenser 3 is in turn cooled by the cooling fluid passing through the high temperature line 5a, which may be cooled by the ambient air in the radiator 10. A cab heater 26 is arranged in connection the evaporator 8, and a blend air flap 25 is arranged to control the air flow for heat exchange with either the evaporator 8 or the cab heater 26, or past both of them without interaction. In summer conditions the air flow will be controlled into heat exchange with the evaporator 8 and will thereby be cooled.

In winter conditions, with a typical ambient temperature of about 5° C. or lower, heating of both the cab and the batteries may be needed, preferably at different temperatures. Hence, in such conditions the relatively warm cooling fluid passing through the high temperature line 5a will heat the air provided into the cab via heat exchange with the cab heater 26. The AC-valve 22 is closed in this mode and no evaporation will occur in the evaporator 8. Possibly, no further cooling of the cooling fluid in the high temperature line 5a is needed in winter conditions. Hence, the radiator bypass valve 12 may be controlled to bypass the radiator 10 with the full flow of cooling fluid in the high temperature line 5a.

Instead, in this mode the radiator 10 is arranged to take up heat from the surroundings that is utilized in the chiller to heat the condenser, which in turn heats the high temperature line 5a, such that the cab may be heated via the cab heater 26. Hence, in this mode the chiller valve 13 opens towards the radiator 10 via the radiator inlet valve 14. The radiator outlet valve 15 is thus arranged to direct the cooling fluid that has been heated inside the radiator 10 to the chiller line 2a, via the chiller pump 2b, and through the chiller 2.

In typical spring or autumn conditions with an ambient temperature of about 10-15° C. the radiator 10 is cooled by the ambient air. The AC circuit 3b is inactive and no working medium runs through the refrigeration circuit 3a or the AC circuit 3b. The cooling fluid that passes through the chiller 2 is hence unaffected in temperature. The cooled cooling fluid arriving from the radiator 10 via the radiator outlet valve 15 enters the chiller line 2a. The heat return valve 16 is open to a desired degree to achieve a desired temperature in the battery line 4a. Typically, the cooling fluid arriving from the radiator 10 has a temperature of about 10-15° C. and an appropriate temperature of the cooling fluid for cooling is about 20° C. Sensors are arranged to monitor the temperatures and a control unit may be arranged to control the valves and pumps so as to achieve an appropriate temperature.

A problem in the typical spring conditions is that cooling may be needed for not only the battery 4, but also for the high temperature line 5a. This may be achieved in that a portion of the flow in the high temperature line 5a is allowed to enter the mixing line via the heat return valve 16, and that a relatively cooler cooling fluid is returned to the high temperature line 5a via the battery outlet valve 18. As an alternative, the radiator 10 may be utilized part of the time to cool the high temperature line 5a and part of the time to cool the chiller line 2. In certain conditions the cooling capacity is however not enough. Therefore, more cooling capacity may be provided.

Figure 3:
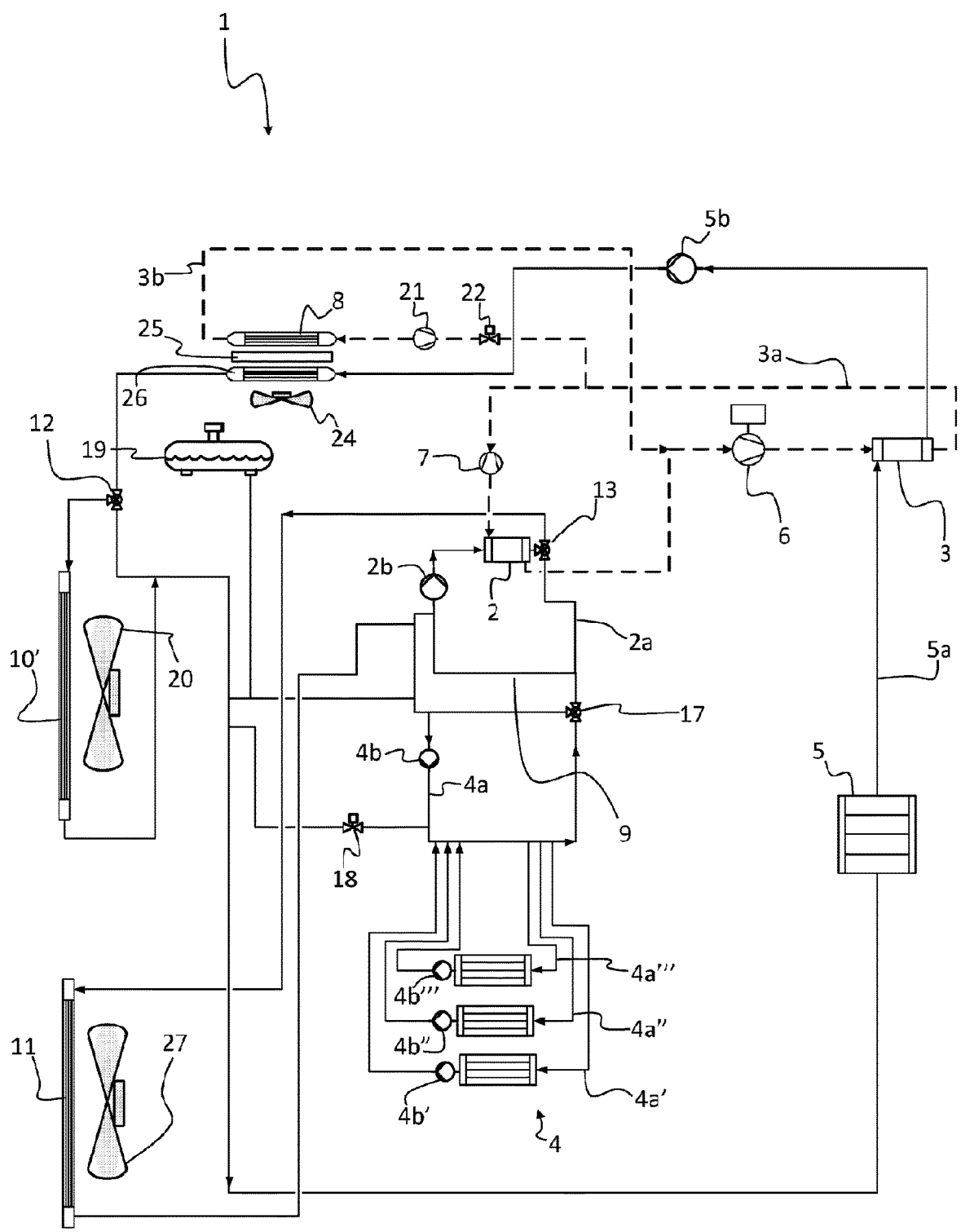
FIG. 3 is a schematic representation of a cooling system according to a third embodiment.

In FIG. 3 a cooling system 1 according to a third embodiment is shown. In this embodiment a second radiator is arranged to provide more cooling capacity. The two radiators may be denoted a high temperature radiator 10' and a low temperature radiator 11, although their function may be similar. A low temperature radiator fan 27 may be arranged to provide a forced flow past the low temperature radiator 11 and increase its heat exchange efficiency, and a high temperature radiator fan 20 may be arranged to provide a forced flow past the high temperature radiator 10'. The high temperature radiator 10' is dedicated to cool the high temperature line 5a. A radiator bypass valve 12 is arranged to connect a selectable portion of the flow in the high temperature line 5a past the high temperature radiator 10'. Hence, the radiator bypass valve 12 may be controlled to circulate the high temperature line 5e and bypass the high temperature radiator 10', to allow the flow pass through the high temperature radiator 10', or to divide the flow there between to any desired degree.

The low temperature radiator 11 is arranged to heat the chiller line 2a in a heat pump mode during winter conditions and to cool the battery 4 via the mixing line 9 in summer and spring conditions, unless the battery line 4a needs a temperature that is lower than the ambient temperature.

A main advantage of the cooling system shown in FIG. 3 is that no limitations exists with regard to the cooling. In summer conditions both the high temperature radiator 10' and the low temperature radiator 11 may be utilized to cool cooling fluid. An expansion tank 19 is arranged and connected to a line connecting the high temperature line 5a to the battery line 4a. In contrast to the first and second embodiments, the cooling system 1 according to the third embodiment does not involve a heat return valve 16. Heating and cooling of the battery line 4a may nonetheless be achieved by regulation of the main control valve 17, the battery outlet valve 18 and the battery pump 4b, which governs the overall flow in the battery line 4a.

Figure 4:
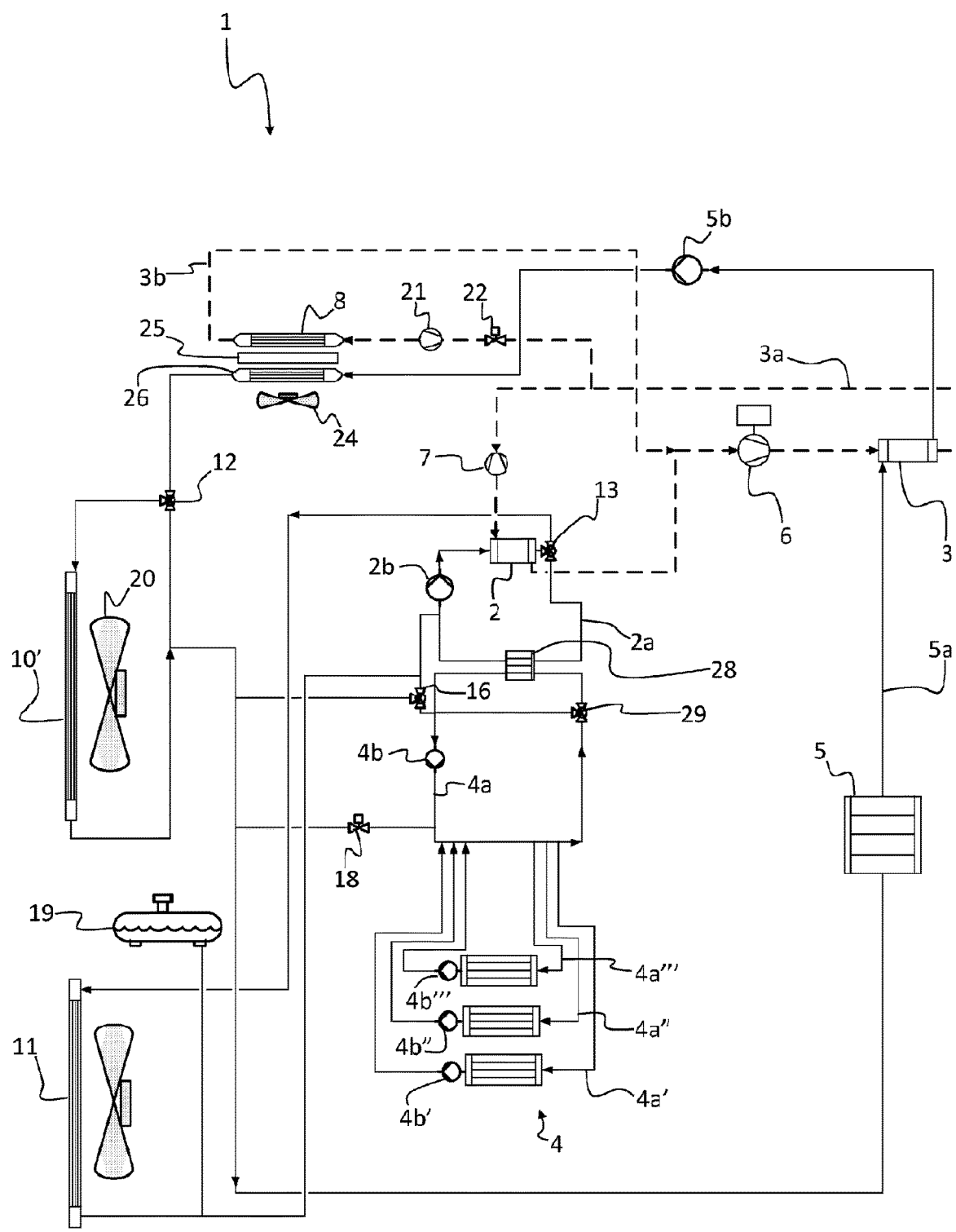
FIG. 4 is a schematic representation of a cooling system according to a fourth embodiment.

In FIG. 4 a cooling system according to a fourth embodiment is shown. In this embodiment a heat exchanger 28 is arranged to replace the mixing line of the embodiments described above and to provide the heat exchange between the chiller line 2a and the battery line 4a without mixing the different fluids. A heat exchanger bypass valve 29 is arranged in the battery line 4a to direct a desired portion of the cooling fluid circulated in the battery line to the heat exchanger 28. Other than that, the cooling system is almost identical to the cooling system according to the third embodiment shown in FIG. 3. A heat return valve 16 is arranged with a slightly different function than in the embodiments above in that it may control a flow from either the high temperature line 5a or the chiller line 2a to the battery line 4a.

Figure 5:
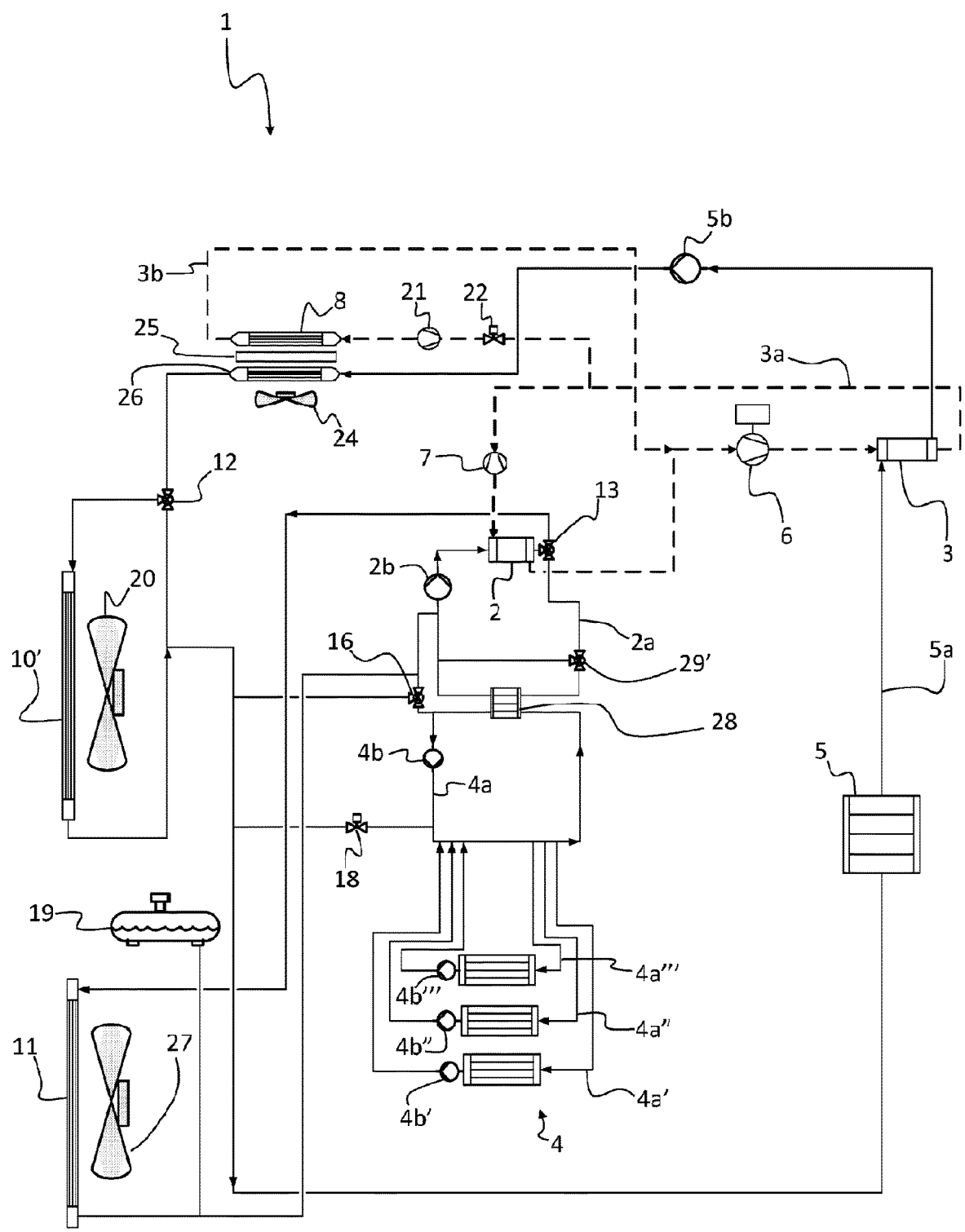
FIG. 5 is a schematic representation of a cooling system according to a fifth embodiment.

In FIG. 5 a cooling system according to a fifth embodiment is shown. The cooling system according to this embodiment is for most details identical to the fourth embodiment shown in FIG. 4. A first difference is that the heat exchanger valve 29' is arranged in the chiller line 2a instead of the battery line 4a. The result is however similar in that heat exchange is achieved by opening the heat exchanger valve 29' to the heat exchanger 28 and that heat exchange may be avoided, to a desired degree, by opening the heat exchanger valve 29' to the line bypassing the heat exchanger 28. The heat return valve 16 is arranged to connect an inlet from the high temperature line 5a to the battery line 4a, whereby a corresponding flow is allowed to exit the battery line 4a for the high temperature line 5a via the battery outlet valve 18. The heat return valve 16 may also be arranged to connect an inlet from the chiller line 2a to the battery line 4a, to cool the battery line 4a, but in this embodiment such heat exchange is typically achieved via the heat exchanger 28 and controlled by the heat exchanger valve 29'.

A main difference of the fourth and fifth embodiments with respect to the other embodiments is that the cooling fluid is at least partly kept separated in the fourth and fifth embodiments. Hence, heat exchange between the chiller line 2a and the battery line 4a is performed via a heat exchanger 28, whereas in the other embodiments the heat exchange is achieved by mixing of the cooling fluids of the separate lines. As indicated above, the term "into heat exchange" is used to cover both the heat exchange by mixing of cooling fluid and the heat exchange of cooling fluid achieved over a heat exchanger, without mixing of the cooling fluids.

Figure 6:
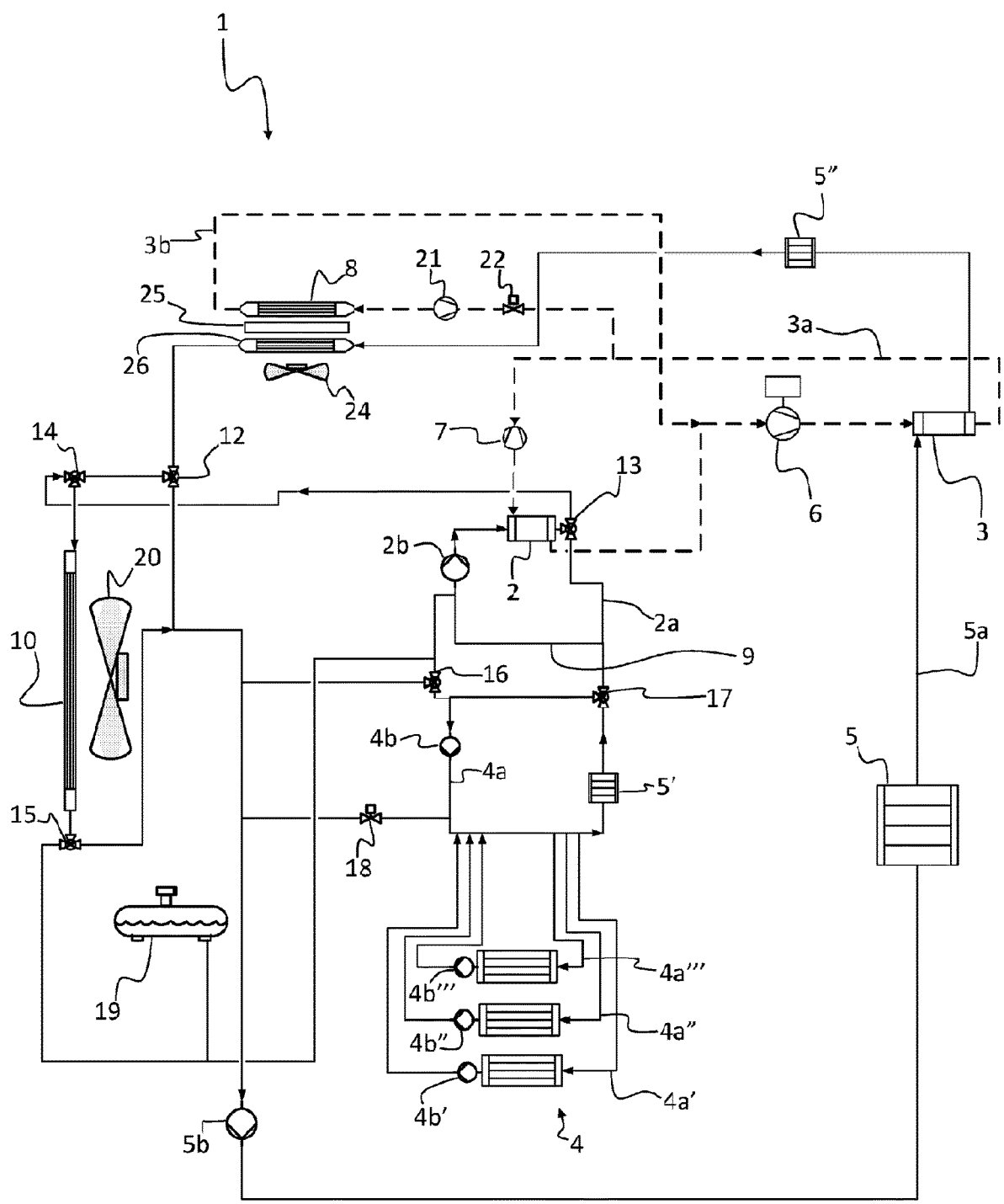
FIG. 6 is a schematic representation of a cooling system according to a sixth embodiment.

In FIG. 6 a cooling system according to a sixth embodiment is shown, which is identical to the cooling system according to the second embodiment shown in FIG. 2, except for three details. Firstly, the high temperature pump 5b is located downstream of the outlet from the radiator 10. Further, first and a second auxiliary heat sources, typically in the form of electrical heaters, are arranged in the system. The first auxiliary heat source 5' is arranged in the battery line to provide dedicated heat to the battery 4, whenever such heating is desired. The second auxiliary heat source 5" is arranged along the high temperature line 5a between the condenser 3 and cab heater 26 so as to make sure that there will always be sufficient heat to heat the cab.

Figure 7:
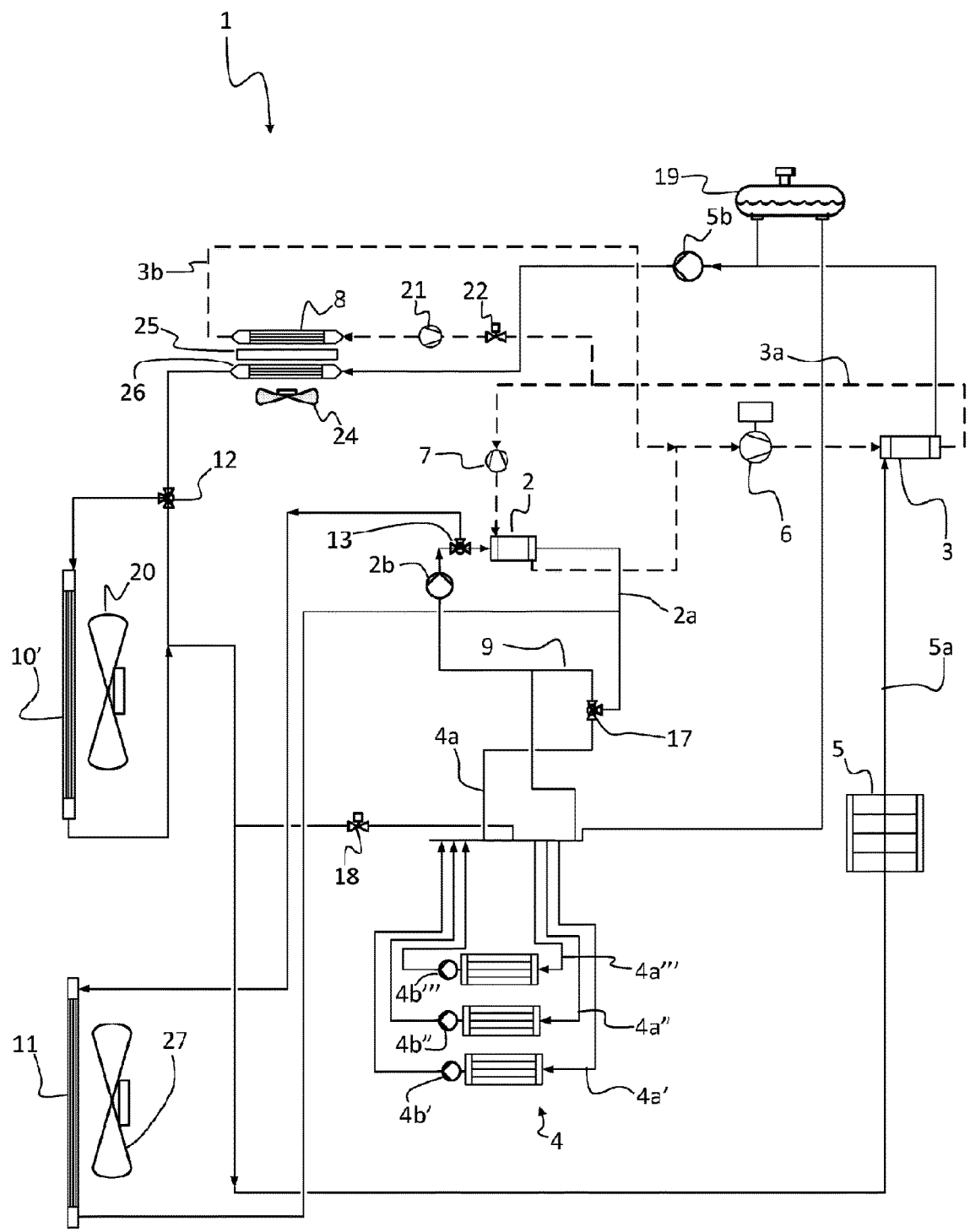
FIG. 7 is a schematic representation of a cooling system according to a seventh embodiment.

In FIG. 7 a cooling system according to a seventh embodiment is shown. This seventh embodiment illustrates that the battery pump 4b of all other embodiments may be omitted in view of that circulation of the cooling fluid will be provided by the individual pumps 4b', 4b" and 4b''' of the sub-lines 4a', 4a" and 4a''' of the battery line 4a.

As for the other embodiments, the main mixing valve 17 governs how much of the cooling fluid from the chiller line 2a that is circulated into the battery line 4a. Further, in a case when heating of the batteries 4 is desired, cooled cooling fluid will be allowed to exit from the battery line 4a into the high temperature line 5a via the battery outlet valve 18.

The individual pumps 4b', 4b" and 4b''' of the sub-lines 4a', 4a" and 4a''' may be individually governed so as to provide individual cooling (or heating) of each of the battery packs. The temperature of the cooling fluid will be the same entering the different sub-lines 4a', 4a" and 4a''', but the cooling of the individual battery packs may be governed by applying different fluid flows by the individual pumps 4b', 4b" and 4b''', such that each battery pack will obtain the optimal cooling (or heating) needed for said battery pack.

Figure 8:
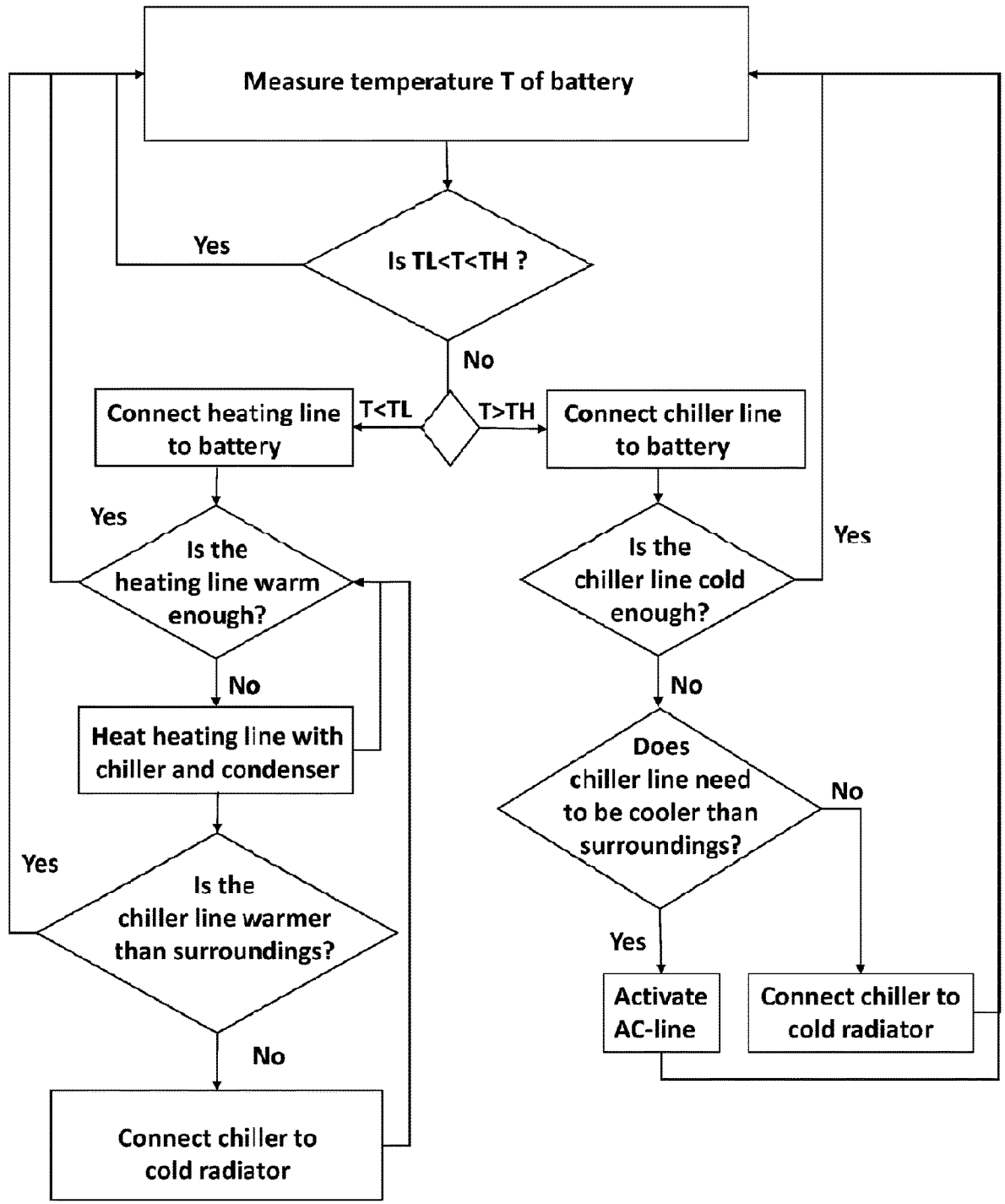
FIG. 8 is a block diagram of a method of climatizing a battery.

In FIG. 8 a method of tempering a battery is shown in the form of a schematic block diagram.

The method is adapted to be performed with the cooling system described above according to whichever one of the embodiments. The method comprises inter alia the following steps.

Firstly, the temperature T of the battery 4 is monitored, either continuously or at predetermined occasions, such as once every specific interval or at specific occasions. In order to function at its best, the battery should be kept in a specific temperature range, i.e. the temperature of the battery should be higher than a low threshold temperature TL and lower than a high threshold temperature TH; TL<T<TH. In a typical embodiment the low threshold temperature TL is about 15° C. and the high threshold temperature TH is about 30° C. These are however only example temperatures and the thresholds depend on the specific type of battery used. The interval between the thresholds may also be broader or narrower, and/or it may be dependent on other parameters, such as the outside temperature, motor capacity used and the like.

If the temperature T of the battery 4 is lower than the low threshold temperature TL, heating is considered needed and a control unit will control relevant valves and pumps of the cooling system to provide cooling fluid from a heating line, i.e. the high temperature line 5a, to the battery 4. The high temperature line 5a is normally heated be a heat source 5, typically in the form of an engine and/or power electronics of a vehicle, said engine and/or power electronics thereby being cooled to a appropriate working temperature.

In connection to this step of providing cooling fluid from a high temperature line to the battery, the temperature of the cooling fluid in said high temperature line is monitored. If the temperature in said high temperature line is sufficient to heat the battery heating will proceed by regulating the relevant valves of the cooling system so as to provide appropriate amount of cooling fluid from the high temperature line to the battery 4.

If, on the other hand, the temperature of the cooling fluid in said high temperature line 5a is not sufficiently high to heat the battery, then said cooling fluid will be heated. In a first step, if the low temperature radiator 11 is in use, it will be bypassed so that cooling of the cooling fluid is avoided. Secondly, heating may be accomplished by a heat exchange with the condenser 3. The chiller 2 provides heat to the condenser via the chiller line 2a. If the cooling fluid in the chiller line 2a is cooler than the ambient air temperature, heat may be taken from the high temperature radiator 10,10' and circulated in the chiller line 2a to the chiller 2. Heating of the battery may then be continuously upheld so as to keep the temperature T of the battery 4 within the desired temperature range. If heating becomes too effective such that the temperature T of the battery exceeds an upper threshold, which may be the same or may be lower than the high threshold temperature TH, the valves will be regulated to decrease the heating efficiency, or the chiller output may be decreased. In a specific embodiment no cooling by means of the AC circuit 3b will be started when heating is under way.

If, on the contrary, the temperature T of the battery 4 is higher than the high threshold temperature TH; T>TH, cooling is considered needed and the control unit will control relevant valves and pumps of the cooling system to provide cooling fluid to cool the battery 4. This is achieved by connecting the chiller line 2a to heat exchange with the battery line 4a, either directly or via a heat exchanger 28.

At this point the temperature of the cooling fluid in the chiller line 2a will be measured. If the temperature of said cooling fluid is cold enough the cooling of the battery 4 may be accomplished by regulation of the concerned valves and pumps. If the chiller line 2a is not cold enough it will need to be cooled. The temperature of the chiller line 2a is then compared with the ambient temperature. If the ambient temperature is colder than the chiller line, the chiller valve 13, will be controlled to open to a radiator 10, 11 so as to cool the chiller line 2a by means of the ambient air. If this is not enough, refrigeration circuit 3a will be activated. The chiller 2 will thus emit heat to the high temperature line 5a via the condenser 3. The high temperature line 5a may, if necessary, be cooled by heat exchange with ambient air in a radiator, e.g. the high temperature radiator 10, 10'.

Figure 9:
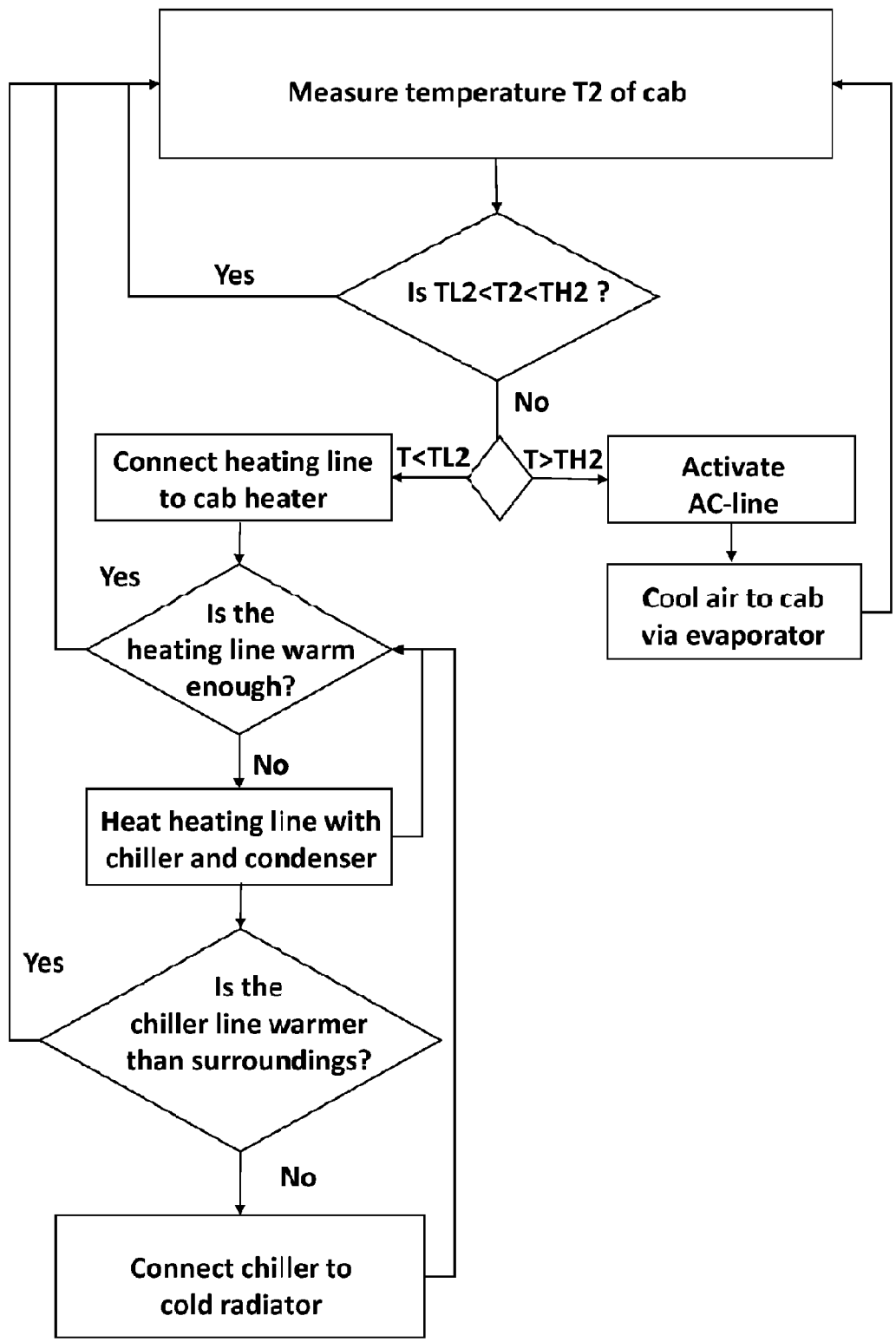
FIG. 9 is a block diagram of a method of tempering a cab of a vehicle.

In FIG. 9 a method of climatizing a cab of a vehicle is shown in the form of a schematic block diagram. This method may be performed in parallel with the method of tempering a battery as described above, using the same features, or it may be a separate method.

Firstly, the temperature T2 of the cab is monitored, either continuously or at predetermined occasions, such as once every specific interval or at specific occasions. For the convenience of the driver and passengers in the cab the temperature inside the cab should be kept within a very narrow temperature range typically set from within the cab. The temperature of the battery should be higher than a low threshold temperature TL2 and lower than a high threshold temperature TH2; TL2<T2<TH2. In a typical embodiment the temperature range of the set temperature is very narrow such that no bigger deviation than half a degree Centigrade is allowed.

If the temperature T2 of the cab is lower than the low threshold temperature TL2, heating is considered needed and a control unit will control relevant valves and pumps of the cooling system to provide heat exchange in the cab heater with cooling fluid from a heating line, i.e. the high temperature line 5a, to the cab.

If, on the other hand, the temperature of the cooling fluid in said heating line is not sufficient to heat the cab, then said cooling fluid will be heated. In a first step, if the low temperature radiator 11 is in use, it will be bypassed so that cooling of the cooling fluid is avoided. Secondly, heating may be accomplished by a heat exchange with the condenser 3. The chiller 2 provides heat to the condenser via the chiller line 2a. If the cooling fluid in the chiller line 2a is cooler than the ambient air temperature, heat may be taken from the low temperature radiator 10,11 and circulated in the chiller line 2a to the chiller 2. Heating of the battery may then be continuously upheld so as to keep the temperature T2 of the cab within the desired temperature range. If heating becomes too effective such that the temperature T2 of the battery exceeds an upper threshold, which may be the same or may be lower than the high threshold temperature TH2, the inlet temperature may easily be regulated by the blend air flap 25. Also, the valves may be regulated to decrease the heating efficiency, or the chiller output may be decreased. Normally, no cooling by means of the AC circuit 3b will be started when heating is under way. The cooling fluid of the high temperature line 5a, may never be heated to a higher than at which the power electrics may operate. Specifically, said cooling fluid is arranged to cool the power electrics of the vehicle.

If, on the contrary, the temperature T2 in the cab is higher than the high threshold temperature TH2; T2>TH2, cooling is considered needed and the control unit will command the AC-system to start working.

With the AC-system in operation cooling of the cab is performed in a conventional manner.

Above, the invention has been described with reference to specific embodiments. The invention is however not limited to these embodiments. It is obvious to a person skilled in the art that other embodiments are possible within the scope of the following claims.

The invention claimed is:

1. A cooling system for controlling a temperature of a battery inside a specific temperature interval, the cooling system comprising:
    a chiller and a chiller line arranged in heat exchange with said chiller;
    a heat source and a high temperature line arranged in heat exchange with said heat source;
    a battery line arranged in heat exchange with the battery;
    at least one pump, arranged to in operation convey a cooling fluid in at least one of said chiller line, high temperature line, or battery line;
    a condenser and a refrigeration circuit arranged in heat exchange with said condenser, wherein a working medium is arranged to, in operation, be circulated in said refrigeration circuit,
        wherein the chiller line is selectively connectable into heat exchange with the battery line so as to provide cooling of the battery,
        wherein the high temperature line is selectively connectable into heat exchange with the battery line to heat the battery, wherein the working medium of the refrigeration circuit is arranged to be cooled by heat exchange with the cooling fluid in the high temperature line in said condenser, and
        wherein the refrigeration circuit is arranged by the chiller, said chiller being arranged to heat the working medium of the refrigeration circuit by heat exchange with the cooling fluid in the chiller line, which cooling fluid is thereby cooled;
    a mixing line operably fluidly connected to the chiller line, the battery line, and the high temperature line; and
    at least one valve connected with the mixing line, wherein the chiller line and the battery line are directly connected to the at least one valve, and wherein in a selected mode, the at least one valve fluidly connects the chiller line and the high temperature line with the battery line via the mixing line, such that the same cooling fluid may be circulated between all of said chiller line, high temperature line, and battery line.

2. The cooling system according to claim 1, wherein the cooling system comprises at least one radiator, which is connectable to the chiller, such that coolant from the chiller is provided to the radiator to thereby heat the coolant and to thereby selectively heat said chiller.

3. The cooling system according to claim 1, wherein the at least one valve is further arranged to selectively connect the chiller line into heat exchange with the battery line so as to provide cooling of the battery, and
wherein the cooling system further comprises a battery outlet valve arranged to selectively connect the high temperature line for heat exchange with the battery line to heat the battery.

4. The cooling system according to claim 1, wherein the heat source is an electric engine, a combustion engine or an electric heater.

5. The cooling system according to claim 1 further comprising an AC circuit for providing an air flow of a desired temperature to a cab, the condenser being arranged to cool the working medium that is circulated in said AC circuit and wherein said AC circuit comprises an evaporator for absorbing heat to said working medium from the air flow to be provided to the cab as said working medium is evaporated in said evaporator.

6. The cooling system according to claim 1, wherein the at least one valve comprises a main mixing valve arranged to selectively connect the battery line to the chiller line via the mixing line, and wherein the cooling system further comprises:
a battery outlet valve arranged to selectively connect the battery line to the high temperature line.

7. The cooling system according to claim 1, wherein the battery line comprises a plurality of sublines for cooling separate battery packs or separate portions of the battery, each subline being provided with a separate pump.

8. The cooling system according to claim 1 further comprising:
sensors arranged to monitor respective temperatures in one or more of the chiller line, high temperature line, or the battery line; and
a control unit arranged to control the heat exchange between the chiller line and the battery line or between the high temperature line and the battery line based on temperatures sensed by said sensors.

9. A vehicle comprising a cooling system according to claim 1.

10. A method of controlling a temperature of a battery in a vehicle, the method comprising:
using the cooling system according to claim 1;
monitoring a current temperature of said battery;
based on said monitored temperature, determining if said battery needs to be cooled or heated, wherein cooling is determined if the current temperature is above a high threshold temperature, and wherein heating is determined if the current temperature is below a low threshold temperature;
if the current temperature is above said high threshold temperature, providing a cooling fluid of a temperature that is lower than said high threshold temperature to cool said battery with cooling fluid cooled in the chiller, said chiller thereby heating a working medium that is circulated to the condenser where it is cooled;
if the current temperature is below said low threshold temperature, providing a cooling fluid of a temperature that is higher than said low threshold temperature to heat said battery from the heat source and/or said condenser;
monitoring a temperature of said cooling fluid in the high temperature line; and
if the temperature of the cooling fluid in said high temperature line is not sufficiently high to heat the battery and the temperature of the cooling fluid in the chiller line arranged in heat exchange with said chiller is cooler than an ambient temperature, heat said chiller by heat from at least one radiator connectable to the chiller.

11. The method of claim 10, further comprising steps for air climatization of a cab in a vehicle, the method comprising:
monitoring a current temperature of said cab;
based on said monitored temperature, determining if said cab needs to be cooled or heated, wherein cooling is determined if the current temperature is above a high threshold temperature, and wherein heating is determined if the current temperature is below a low threshold temperature;
if the current temperature is above said high threshold temperature, providing heat exchange in an evaporator for the air flow entering the cab with working fluid arriving from said chiller; and
if the current temperature is below said low threshold temperature, providing heat exchange for air flow entering the cab with the cooling fluid heated by said heat source and/or said condenser.

12. The cooling system according to claim 2, wherein the cooling system comprises a radiator, which is connectable to the high temperature line, so as to selectively cool the cooling fluid in said high temperature line, said radiator being either the same radiator as the at least one radiator that is connectable to the chiller, or a separate radiator.

13. The cooling system according to claim 1, wherein a section of the high temperature line is separately arranged relative to said condenser such that the working medium of the refrigeration circuit is arranged to be cooled by heat exchange with the cooling fluid in the high temperature line in said condenser.

* * * * *